United States Patent [19]

Virkar et al.

[11] 4,113,928
[45] Sep. 12, 1978

[54] METHOD OF PREPARING DENSE, HIGH STRENGTH, AND ELECTRICALLY CONDUCTIVE CERAMICS CONTAINING β″-ALUMINA

[75] Inventors: Anil V. Virkar; Mark L. Miller; Ivan B. Cutler; Ronald S. Gordon, all of Salt Lake City, Utah

[73] Assignee: University of Utah, Salt Lake City, Utah

[21] Appl. No.: 788,572

[22] Filed: Apr. 18, 1977

Related U.S. Application Data

[63] Continuation-in-part of Ser. No. 658,160, Feb. 17, 1976, abandoned.

[30] Foreign Application Priority Data

Feb. 17, 1977 [BE] Belgium .................................. 17952

[51] Int. Cl.$^2$ ............................................. H01M 6/18
[52] U.S. Cl. ...................................... 429/193; 264/57
[58] Field of Search .................... 429/49, 104, 193; 264/56, 57

[56] References Cited

U.S. PATENT DOCUMENTS

| | | | |
|---|---|---|---|
| 3,535,163 | 10/1970 | Dzieciuch | 429/49 |
| 3,895,963 | 7/1975 | McGowan et al. | 429/193 |
| 3,901,733 | 8/1975 | Toy et al. | 429/193 |
| 3,903,225 | 9/1975 | Jones et al. | 264/57 |
| 3,950,463 | 4/1976 | Jones | 264/57 |

*Primary Examiner*—Donald L. Walton
*Attorney, Agent, or Firm*—Criddle, Thorpe & Western

[57] ABSTRACT

Methods of preparing a dense and strong polycrystalline β″-alumina-containing ceramic body exhibiting an electrical resistivity for sodium ion conduction at 300° C of 9 ohm-cm or lower obtained directly after sintering and having a controlled fine microstructure exhibiting a uniform grain size under 50 micrometers. The invention more particularly relates to methods of uniformly distributing selected metal ions having a valence not greater than 2, e.g. lithium or magnesium, uniformly throughout the beta-type alumina composition prior to sintering to form β″-alumina. This uniform distribution allows more complete conversion of β-alumina to β″-alumina during sintering. As a result, the polycrystalline β″-alumina containing ceramic bodies obtained by methods of this invention exhibit high density, low porosity, high strength, fine grain size (i.e. no grains over 25–50 micrometers with an average size under 5–10 micrometers), low electrical resistivity and a high resistance to degradation by water vapor in an ambient atmosphere.

26 Claims, 1 Drawing Figure

METHOD OF PREPARING DENSE, HIGH STRENGTH, AND ELECTRICALLY CONDUCTIVE CERAMICS CONTAINING β"-ALUMINA

The U.S. Government has rights in this invention pursuant to contract C-805 awarded by the National Science Foundation.

This application is a continuation-in-part of U.S. patent application Ser. No. 658,160 filed Feb. 17, 1976 and now abandoned.

This application relates to methods for preparing dense, strong, β"-alumina containing ceramic bodies having a low electrical resistivity for sodium ion conduction. More particularly, this application relates to methods for preparing polycrystalline β"-alumina-containing bodies exhibiting low porosity, small grain size, near theoretical density, low electrical resistivity, high strength and a high resistance to degradation by water vapor under ambient conditions. Still more particularly, this application relates to methods for preparing polycrystalline β"-alumina-containing bodies which are ideally suited for use as reaction zone separators or solid electrolytes in certain electrical conversion devices.

Among the polycrystalline bi- or multi-metal oxides which are most useful in electrical conversion devices, particularly those employing molten metal and/or molten metal salts as reactants, are those in the family of beta-aluminas, all of which exhibit a generic crystalline structure which is readily indentifiable by x-ray diffraction. Thus, beta-type alumina or sodium beta-type alumina is a material which may be thought of as a series of layers of aluminum oxide ($Al_2O_3$) held apart by columns of linear Al—O bond chains with sodium ions occupying sites between the aforementioned layers and columns. Numerous beta type alumina polycrystalline materials exhibiting this generic crystalline structure are disclosed in the following U.S. patents, the disclosures of which are incorporated herein by reference: U.S. Pat. Nos. 3,404,035; 3,404,036; 3,413,150; 3,446,677; 3,458,356; 3,468,709; 3,468,719; 3,475,220; 3,475,223; 3,475,225; 3,535,163; 3,719,531; and 3,811,943.

Among the numerous polycrystalline beta-type alumina materials disclosed in these patents and which may be processed in accordance with the methods of this invention are those which are modified by the addition of a minor proportion by weight of metal ions having a valence not greater than two (2) such that the modified beta-type alumina composition comprises a major proportion by weight of ions of aluminum and oxygen and a minor proportion by weight of metal ions in crystal lattice combination along with cations which migrate in relation to the crystal lattice as a result of an electric field, the preferred embodiment being wherein the metal ion having a valence not greater than two (2) is either lithium or magnesium or a combination of lithium and magnesium. These metals may be included in the composition in the form of lithium oxide or magnesium oxide or mixtures thereof in amounts ranging from about 0.1 to about 5 weight-percent, preferable from about 0.1 to about 1.5 weight-percent. This type of modified beta-type alumina is more thoroughly discussed in U.S. Pat. Nos. 3,475,225 and 3,535,163 mentioned above, and in U.S. Pat. Nos. 3,950,463 and 3,895,963. Such lithia and magnesia-stabilized beta-alumina are preferred compositions for the preparation of beta-type alumina bodies demonstrating the β" crystal structure.

The prior art suggests the utility of such dopant material to stabilize the beta-type structure, to enhance densification and to reduce resistivity. The above stated references indicate that satisfactory results are obtained from mere mixing of the dopant materials with the remaining constituents. Mechanical mixing is the primary method heretofore relied on to achieve the appropriate state of dopant distribution within the β"-alumina material.

The energy conversion devices for which the dense polycrystalline β-alumina containing bodies of this invention are particularly useful as reaction zone separators or solid electrolytes are disclosed in some detail in the aforementioned patents. In the operation of such energy conversion devices, the cations such as sodium in the β"-alumina, or some other cation which has been substituted for sodium in part or in whole migrates in relation to the crystal lattice as a result of effects caused by an electric field. Thus, the solid ceramic electrolyte made by the process of this invention is particularly suited since it provides selective cationic communication between the anodic and cathodic reaction zones of the energy conversion devices and is essentially impermeable to the fluid reactants employed in the device when the reactants are in the elemental, compound or anionic state. Among the energy conversion devices in which the particular polycrystalline β"-alumina containing ceramics are useful are:

(1) primary batteries employing electrochemically reactive oxidants and reductants in contact with and on opposite sides of the solid electrolyte or reaction zone separator;

(2) secondary batteries employing molten, electrochemically reversible reactive oxidants and reductants in contact with and on opposite sides of the solid electrolyte or reaction zone separator;

(3) thermoelectric generators wherein a temperature and pressure differential is maintained between anodic and cathodic reaction zones and/or between anode and cathode and a molten alkaline metal which is converted to ionic form, passed through the polycrystalline β"-alumina-containing ceramic wall inorganic membrane and reconverted to elemental form; and (4) thermally regenerated fuel cells.

A review of the operation of such electrical conversion devices as disclosed in the aforementioned patents and detailed at length in the literature should make it clear that the conductive ceramic material employed in the preparation of these devices should have a low electrical resistivity and high strength.

In particular the solid electrolytes to be used in the sodium sulfur battery must meet stringent requirements with respect to physical and mechanical properties for the attainment of good performance and long service life. The strength properties for example should be at least 20 kpsi, preferably as high as 40–50 kpsi, and the resistivity should be as low as about 3 to 9 ohm-cm at the operating temperature of the cell. It is, therefore, desirable to produce a ceramic electrolyte of such low resistivity and high strength by a commercially practical process.

It is well known that the physical and mechanical properties of ceramics depend on microstructure and composition among other parameters. For example, it is well known that grain size should be as small as possible.

It is also well known to those familiar with the fabrication of polycrystalline ceramic materials that the technique of hot pressing or pressure sintering, which permits densification to be achieved at lower temperatures, leads to the formation of fine-grained materials which are completely dense (i.e. contain no porosity). Ceramic materials in this form normally possess the highest mechanical strengths which can be achieved in a polycrystalline body.

Previous work has shown that fracture strengths (obtained on bar specimens under four-point loading conditions) between 30,000 and 40,000 psi can be achieved in polycrystalline $\beta''$-alumina which has been hot pressed at 1400° C. and annealed at lower temperatures. Also, it has been shown that in dense polycrystalline $\beta''$-alumina the fracture strength begins to deteriorate rapidly when the largest grain size in the distribution of grain sizes exceeds about 125 micrometers in size. Thus, for high strengths in polycrystalline $\beta''$-alumina it is essential that microstructures be produced with small average grain sizes (< 10 micrometers) so that no grains are present in the distribution which exceed about 125 micrometers in size. While such fine grain sizes are possible using a hot pressing technique, such processes are expensive and thus not practical for commercial production of large numbers of $\beta''$-alumina bodies. A common objective, therefore, in the fabrication of $\beta''$-alumina ceramic is to achieve by a less expensive technique, such as conventional sintering, bodies with fine grained microstructures and correspondingly high mechanical strengths.

It is known by those skilled in the art that in a reactive sintering process such as the one used for forming $\beta''$-alumina, accompanying exaggerated grain growth may depend on composition as well as phase distribution. Prior art techniques for the preparation of conductive beta-type alumina cramic either produce materials of high strength and high electrical resistivity or materials of low strength and low electrical resistivity, depending upon the time and temperature of sintering. Those bodies which have been sintered at higher temperatures and for longer periods of time in order to lower the resistivities often tend to exhibit a multiple grain structure with grains ranging up to 150 to 200 micrometers or even more in size. Such variable grain structure has a deleterious effect on fracture strength, elastic modulus and fracture toughness of the sintered body. Those bodies which have been sintered at lower temperatures or for shorter periods of time, on the other hand, while demonstrating a small grain size which is desirable for maintaining the strength of the body, do not exhibit the low electrical resistivity which is desired, presumably because substantial amounts of $\beta$-alumina remain unconverted to the $\beta''$ crystalline form.

Still another prior art technique has been developed wherein a rapid sintering step at temperatures between 1520° and 1650° C. is followed by a prolonged (1-40 hours) thermal anneal at temperatures between about 1300° C. and about 1500° C. In this process a low resistivity $\beta''$—$Al_2O_3$ ceramic with a much finer grain size and a reasonable strength can be produced. The post-sintering treatment normally at a temperature lower than that used for sintering provides for a more complete conversion to $\beta''$-$Al_2O_3$ while at the same time reduces the occurrence of excessive deleterious grain growth. Such a technique of sintering and annealing is disclosed in U.S. Pat. No. 3,903,225, in which a beta alumina ceramic after sintering at a temperature between 1500° and 1900° C. for less than 3 minutes is subjected to a heat treatment at a temperature between 1200° C. and 1600° C. but at least 50° C. below the minimum sintering temperature used. This heat treatment is for at least one hour but may be 24 hours or longer and results in an appreciable reduction of the electrical resistivity of the material. While this technique is an improvement over previous methods, it is desirable to eliminate the need for the post-sintering heat soak because of the resultant increased production rates.

It is therefore apparent that although the current state of the art suggests the need for maintaining minimal grain size and avoiding grain growth during sintering and annealing treatments, economic methods for realizing the desired grain size consistency and physical properties have not been accomplished. Indeed, the desired homogeneous dispersion throughout the $\beta''$-alumina of dopant materials such as lithium and magnesium has not been achieved by methods which permit economic implementation. Attempts to solve the resultant problems by annealing improve the quality of $\beta''$-ceramic, but add undesirable costs of manufacturing. What is needed, therefore, is an improved method of obtaining a greater degree of uniform, homogeneous dispersion of the dopant material through the presintered $\beta''$ alumina forming material.

It is therefore an objective of this invention to prepare dense, polycrystalline ceramics exhibiting (1) a fine, more uniform microstructure and greater strength properties than can be achieved by the above sinter plus anneal process, (2) low porosity, and (3) electrical resistivity for sodium conduction at 300° C. under 9 ohm-cm without the necessity of a post sinter annealing step.

It is a further object of this invention to prepare such a dense, high strength, fine microstructured polycrystalline ceramic in which the resitivity may be lowered still further below 9 ohm-cm by a subsequent annealing step of less than 1 hour in duration.

It is a still further object of this invention to prepare such a dense, high strength, fine microstructured polycrystalline ceramic having properties comparable to those achieved by the expensive fabrication technique of hot-presing.

It is an even still further object of this invention to prepare such a dense, high strength, fine microstructured polycrystalline ceramic which is essentially single phase $\beta''$-$Al_2O_3$ and very resistive to mechanical degradation by water vapor under ambient conditions.

BRIEF DESCRIPTION OF THE INVENTION

The above objects as well as other objects and purposes which will be apparent to those skilled in the art are accomplished by the processes of this invention which are based on the discovery that a finer, more uniform microstructure may be achieved in $\beta''$-alumina sintered bodies if the metal ions having a valence not greater than 2, e.g. lithium or magnesium, are uniformly distributed throughout the beta-type alumina composition beyond that accomplished by mechanical mixing methods prior to sintering. Such a uniform distribution allows a more efficient and complete conversion to $\beta''$-alumina.

The methods disclosed and claimed herein allow fabrication by conventional sintering of polycrystalline $\beta''$-alumina containing bodies with a high sodium ion conductivity which is comparable to or better than that obtained using the techniques of the prior art but with microstructures containing much finer grain sizes (i.e. maximum sizes under 25-50 micrometers and average grain sizes under 5–10 micrometers), and, as a consequence, fracture strengths which are comparable to those achieved by hot pressing.

Thus, the processes disclosed herein provide techniques whereby conventional and rapid sintering at temperatures around 1600° C. can be used to produce very fine grained $\beta''$-alumina ceramic bodies with fracture strengths comparable to those achieved in hot pressed material and with low sodium ion resistivities ($\leq$ 9 ohm - cm at 300° C.). The average four point bend strengths of the $\beta''$-alumina ceramic produced by the methods of this invention are over 30,000 psi. When strengths are measured by breaking small diametral segments of electrolyte tubes, average values around 39,000 psi can be achieved. Of course, it is well known to those skilled in the art that the fracture strength of a ceramic body depends on the method of the test. Diametral strengths using sections taken from tubing are usually significantly higher than strengths measured on bars under conditions of four point loading.

As discussed above, the objectives of this invention are met by two processes. These processes are briefly described below:

I. The first process comprises: (a) mixing alumina and a sodium compound such as sodium carbonate with a lithium aluminate compound having the formula $Li_2O$:-$nAl_2O_3$ wherein $n = 5$ or more, preferable 5 to 11 in amounts stoichiometrically suited to form $\beta''$-alumina upon sintering; (b) calcining the mixture at above 1100° C., preferably at about 1250° C., (c) forming the desired green body and (d) sintering at a temperature above about 1500° C., preferably between about 1500° C. and about 1600° C., and most preferably between about 1560° and 1600° C. Near theoretical density and desirable conversion to $\beta''$-alumina will generally be achieved in less than about 10 minutes, typically between about 1 and about 3 minutes. The sintered ceramic body thereby obtained has such values of density, strength, grain size, electrical resistivity and resistance to mechanical degradation by water vapor as would make it ideally suited for use as a reaction zone separator or solid electrolyte in an energy conversion device.

II. The second process briefly comprises (a) preparing a partially deflocculated slurry of alpha or beta alumina in a solution containing soluble sodium and lithium salts, the anions of said salts being subject to decomposition and/or vaporization at temperatures below about 1300° C., (b) spray drying the slurry to capture the cations in the atomized droplets and thereby obtain a powder having improved cation dispersion, (c) calcining the resulting powder at temperatures below 1300° C. to obtain a powder having a composition consistent with the formation of $\beta''$-alumina upon sintering, (d) green forming the powder into a suitably shaped article, and (e) sintering said article at temperatures over 1500° C. and usually around 1600° C. for at least 1 minute and normally less than or equal to 10 minutes.

As mentioned above the processes of this invention do eliminate the need for post-sintering annealing treatment in that they produce directly after sintering a $\beta''$-alumina containing ceramic body with an electrical resistivity for sodium ion conduction at 300° C. of 9 ohm-cm or less, a high mechanical strength, and a fine grained microstructure. However, the sintered $\beta''$-alumina bodies so produced may also be subjected to a post sintering anneal, generally of less than 1 hour duration, in order to further lower their resistivity. Unlike the prior art technique discussed above wherein low temperature post sinter anneals of long duration (i.e., greater than 1 hour) are used to avoid grain growth, our processes allow higher temperature annealing treatments to be carried out (e.g., temperatures of about 1475° to about 1550° C. being useful) without the occurrence of any deleterious grain growth. Such higher temperatures for annealing are desired for rapid conversion to $\beta''$-alumina which results in low sodium ion resistivity.

The various embodiments of the methods of this invention will be more fully understood from the following detailed description of the invention, taken in connection with the accompanying drawing in which FIG. 1 shows grain size distributions in sintered $\beta''$-alumina prepared from (1) partially converted powders and (2) zeta-processed powders.

DETAILED DESCRIPTION OF THE INVENTION

Figure 1:
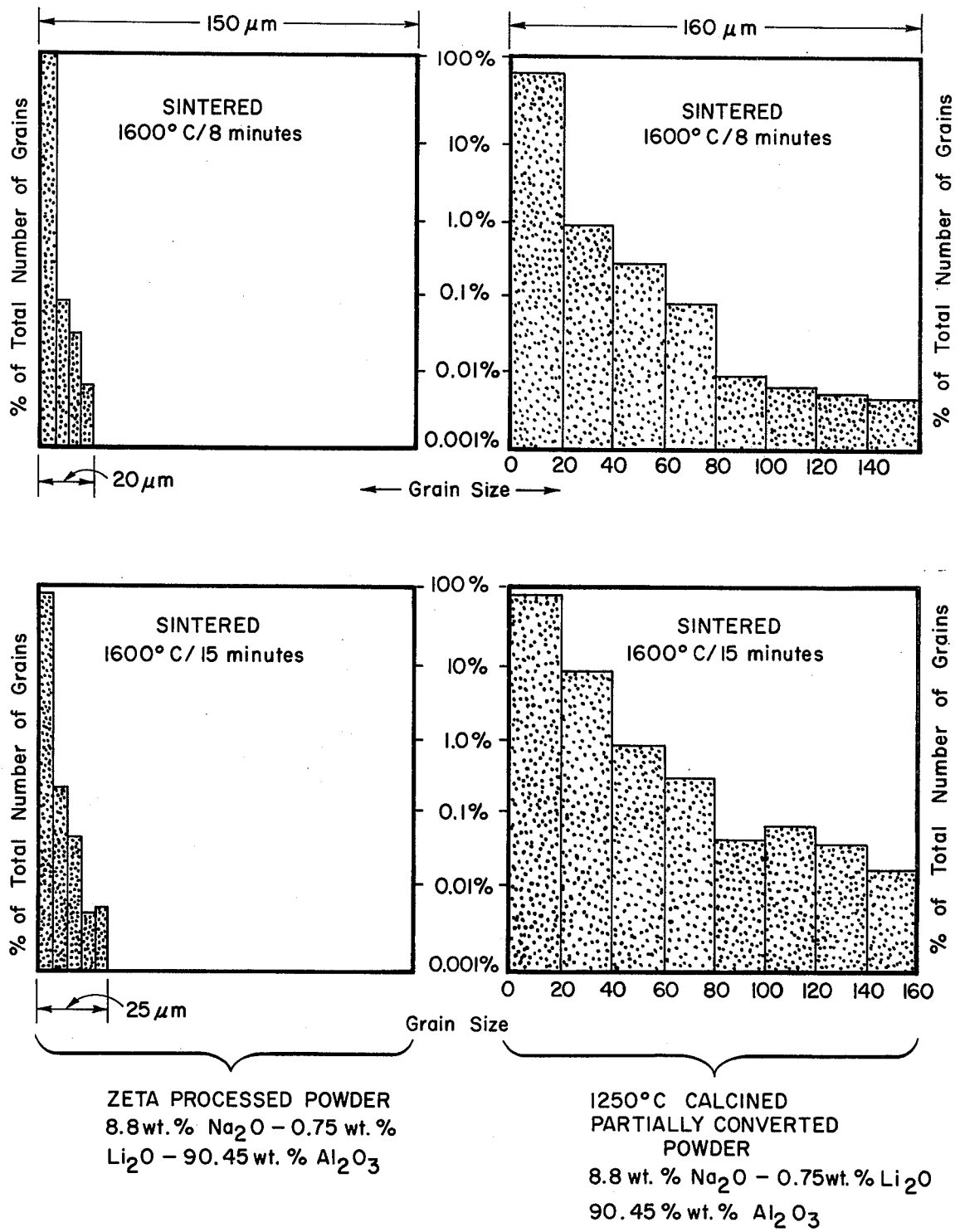

More specifically, the invention sought to be claimed in this application comprises two alternative methods for preparing a dense, strong, fine-grained polycrystalline $\beta''$-alumina containing ceramic body exhibiting an electrical resistivity for sodium ion conduction of 9 ohm-cm or less at 300° C. Both methods involve the improved distribution or introduction of minor constituents or dopants, particularly $Li_2O$, in the powder compact prior to sintering. The methods of this invention can also be applied to $\beta$-alumina compositions which contain various amounts of MgO in addition to or in place of $Li_2O$.

In the first method, a lithium aluminate compound ($Li_2O:nAl_2O_3$) wherein $n$ is at least 5, preferable 5 to 11 and most preferably 5 or 6, is used as the source of lithium in the preparation of the mixture of components necessary to produce $\beta''$-alumina upon sintering. By using $Li_2O:5Al_2O_3$ (zeta-type alumina), for example, a predispersion of the lithium ions is accomplished, thereby improving the effects of later mechanical mixing of the $\beta$-alumina forming composition. By first reacting the $Li_2O$ with $Al_2O_3$ to obtain the $Li_2O:5Al_2O_3$, an initial dispersion is accomplished by chemical arrangement of the Li within the zeta structure. This predispersed composition, when added as a constituent to the $\beta''$-alumina forming composition, permits more effective distribution during presintering preparation.

When using this method it is possible to achieve the desired product using only a short sintering time (e.g., less than about 10 minutes, but typically less than about 3 minutes at temperatures greater than about 1500° C., but preferably between about 1560° and 1600° C.) without the necessity of a post-sintering annealing treatment.

This method of the invention is typically carried out as follows:

(A) Preparing the compound $Li_2O:n5Al_2O_3$.

(B) Preparing a mixture of a compound of sodium such as $Na_2CO_3$ and of $\alpha$-$Al_2O_3$ followed by a calcination step at a temperature of 1200° C. to 1300° C. for up to 2 to 3 hours wherein the said mixture has a composition such that when mixed with appropriate amounts of $Li_2O:nAl_2O_3$ described under (A) it would correspond to a composition consistent with the formation of a $\beta''$-alumina containing ceramic upon sintering; or mixing a compound of sodium such as $Na_2CO_3$, $\alpha$-$Al_2O_3$ and the $Li_2O:nAl_2O_3$ compound in the appropriate amounts to yield a composition consistent with the formation of $\beta''$-alumina upon sintering following a calcination step at a temperature of 1200° to 1300° C. for 2 to 3 hours.

(C) Sintering the green body formed of the powder mixture prepared as described under (B) above either encapsulated or in open air at temperatures between approximately 1560° and 1600° C. for about three minutes such that the green body having a green density of at least 50% of the theoretical density of $\beta''$-alumina is converted on sintering to a ceramic body having a density of at least 90% of the theoretical density of $\beta''$-alumina.

The sintering time and temperature schedules mentioned above, although the most desirable for a production application, are expected to be somewhat flexible, in that a shorter sintering time could be used by raising the sintering temperature or a longer time may be needed at a lower temperature without adversely affecting the properties of the sintered ceramic body containing $\beta''$-alumina. This will be apparent to those skilled in the art of sintering ceramics.

For the preparation of a $Li_2O:nAl_2O_3$ compound such as $Li_2O:5Al_2O_3$, a compound of lithium, such as $LiNO_3$, and $\alpha$-$Al_2O_3$ may be either dry or wet mixed in acetone followed by a drying step in an oven at a temperature of 80°–100° C. The said mixture is then calcined at a temperature of 1200° C. to 1300° C. for 2 to 3 hours in a loosely covered zirconia crucible. Although $LiNO_3$ has been used here, any such appropriate compound of lithium including, for example, lithium oxalate, lithium carbonate, lithium hydroxide, etc., may be used. The calcination temperature can be between 1100° C. and 1400° C. The calcined mixture is then milled, either in a vibratory mill or a ball mill.

For the preparation of the mix described under (B) above, $Na_2CO_3$ and $\alpha$-alumina may be mixed to yield a desired ratio so that upon the addition of $Li_2O:nAl_2O_3$ to this mix a composition consistent with the formation of $\beta''$-alumina can be achieved. The mixture of $Na_2CO_3$ and $\alpha$-$Al_2O_3$ is then calcined at a temperature of about 1200° C. to about 1300° C. for about 2 to 3 hours. The said mixture of sodium carbonate and $\alpha$-$Al_2O_3$ that has been calcined at 1200° C. - 1300° C. as mentioned above is then mixed with appropriate amount of $Li_2O:nAl_2O_3$ to yield a composition consistent with the formation of $\beta''$-alumina upon sintering. The powder mixture so prepared is ready for sintering.

In an alternative procedure, a sodium compound such as $Na_2CO_3$ is mixed with $\alpha$-$Al_2O_3$ and $Li_2O:nAl_2O_3$ in appropriate amounts to yield a composition consistent with the formation of $\beta''$-alumina upon sintering following a calcination step at 1200°–1300° C. for 2 to 3 hours.

The improved nature of the grain size distributions in sintered ceramic bodies prepared from zeta-processed powders as compared with conventional partially converted powders is shown in FIG. 1. In the $\beta''$-alumina prepared from partially converted powders which are typical of the prior art (right side of figure), grains in the grain size distribution up to 160 micrometers are present after a 8–15 minute sintering at 1600° C. Comparison of this grain structure with that resulting from the use of zeta processed powders sintered under comparable conditions (left side of FIG. 1), reveals the reduced grain size illustrated. With maximum grain sizes of less than 25 cm the resistivity and density characteristics required for an operable ceramic were achieved without the post-sintering heat treatment. Furthermore, the utilization of post-sintering heat treatments to obtain even lower sodium ion resistivities can be accomplished at temperatures higher than heretofore, without adverse grain growth.

The second method of this invention, a slurry-solution spray drying method, is comprised of: (1) preparing a partially deflocculated slurry of alpha or beta alumina in a solution containing soluble sodium salts such as a sodium carbonate, sodium oxalate, sodium nitrate, sodium sulfate and sodium nitrite as well as other sodium salts which are soluble in water, and lithium salts such as lithium nitrate, lithium oxalate, lithium chloride as well as other lithium salts which are soluble in water, the anions of said salts being subject to decomposition and/or vaporization at temperatures below 1300° C., (2) spray drying the slurry to obtain a powder, (3) calcining the resulting powder at temperatures below 1300° C. to obtain a powder having a composition consistent with the formation of $\beta''$-alumina upon sintering, (4) green forming the powder into a suitable shaped article by a technique such as, for example, isostatic pressing, (5) sintering said article at temperatures over 1500° C. and usually around 1600° C. for at least one minute and normally less than or equal to ten minutes.

The sintering time and temperature mentioned above, although the most desirable for a production application, are expected to be somewhat flexible, in that a shorter sintering time could be used by raising the sintering temperature or a longer time may be required at a lower temperature without adversely affecting the properties of the sintered ceramic body containing $\beta''$-alumina.

The prior art of stabilizing slurries of alpha alumina as it has been applied to spray drying or slip casting has involved the employment of deflocculating agents to produce deflocculated slurries. Such prior art slurry stabilizations have typically employed adjustment of the pH of aqueous slurries to between 3 and 9. Deflocculants of the polyelectrolyte type such as gum arabic and Darvan$^{(R)}$No. 7 (R. T. Vanderbilt Company, Inc., Norwalk, Conn.) have also been used.

It is most desirable to achieve as concentrated a slurry as can practically be spray dried for the purposes of this invention. A highly concentrated slurry increases the rate of production and also lowers the cost of production of unit weight of spray dried powder.

Two factors which limit the degree of slurry concentration which may be employed are the slurry viscosity and the tendency of the slurry to separate by settling. It is important that a slurry system according to the present invention have a reasonably low viscosity so that it may be pumped into the spray dryer. It should be as concentrated as possible so that the production rate is high. It should also be so slow to separate that it may be pumped to the dryer and atomized into droplets without changing in stoichiometry from feed tank to droplet. Each droplet retains the approximate same relative amount of dopant materials as the total solution, so that the resultant spray dried powder maintains the preferred uniform dispersion of the dopant cations necessary for improved ceramic formation.

Prior art slurry stabilizing techniques are ineffective in the case of alpha alumina slurries in aqueous solutions of high ionic strength. This may be seen from the results of series of tests of the effectiveness of prior art slurry stabilization techniques versus the effectiveness of the technique of the present invention.

In this series of tests slurries of 60 grams of 1.0$\mu$m alpha alumina were tested using 0.6 gram of various nonionic and polyelectrolytic agents (1% based on alumina). The slurries with or without surfactants had pH's of 7.0 to 7.6. The pH of each slurry was adjusted to 6.0 with citric acid and then 8.0 with $NH_4OH$. In each case the viscosity was estimated by timing the flow of slurry out of a 10 ml pipette from a 40 cm head to a 17.5 cm head. These "viscosities" will be quoted in seconds. The slurries were also allowed to settle for 30 minutes and the height of clear layer formed above the slurry was measured. The thickness of the sediment formed on the bottom of the container was estimated by measuring the depth of penetration of a blunt probe weighing 250 grams. The slurries were all 70 mm in depth for these experiments. The results are shown in Table I. It is clearly evident that only the isooctyl phenoxy polyethoxy ethanol at pH 8 was effective in both impeding separation of the slurry and in maintaining a reasonably low slurry viscosity.

In the subsequent sections, the methods of this invention are discussed and illustrated with examples relevant to the production of $\beta''$-alumina stabilized with less than 1 percent by weight of lithium oxide. However, the method of this present invention will be of a far wider applicability, in that it could be utilized in the preparation of $\beta''$-alumina containing ceramic bodies stabilized with magnesium oxide or magnesium and lithium oxides wherein magnesium may be introduced as magnesium-aluminum spinel ($MgAl_2O_4$). Slurry-solution spray drying can easily be adapted to solutions containing soluble magnesium salts.

TABLE I

Slurry Stabilization in Aqueous Solutions of High Ionic Strength

| | | | (After 30 minutes) | |
|---|---|---|---|---|
| Agent (1%) | pH | Viscosity (sec) | Clear Layer (mm) | Sediment (mm) |
| None | 7.58+ | * | — | — |
| | 6.0 | 25 | 16 | 30 |
| | 8.0 | 25 | 13 | 16 |
| Gum Arabic | 7.00+ | No flow | — | — |
| | 6.0 | 86 | 11 | 17 |
| | 8.0 | 67 | 12 | 19 |
| Darvan #7 | 7.53+ | 55 | — | — |
| (R.T. Vanderbilt) | 6.0 | Flow stops | 14 | 24 |
| | 8.0 | 45 | 14 | 21 |
| Isooctyl | 7.30+ | 48 | — | — |
| phenoxy polyethoxy | 6.0 | 35 | 12 | 12 |
| ethanol | 8.0 | 28 | 12 | 10 |
| Polyethylene glycol | 7.40+ | 60 | — | — |
| of about | 6.0 | 53 | 9 | 9 |
| 200 molecular weight | 8.0 | 46 | 10 | 16 |

+Before pH adjustment via citric acid or $NH_4OH$.
*Variable, 21-35 sec depending on history of slurry.

In the examples cited later in this section, encapsulated green bodies are sintered usually in a molybdenum-wound resistance heat furnace with a closed-end alumina service tube. For open air sintering, a continuous pass-through furnace with molybdenum disilicide heating elements is used wherein the rate of heating to and cooling from the sintering temperature is precisely controlled. Such sintering techniques are well known in the art.

The following specific example will serve to illustrate the various embodiments of the methods of this invention in great detail:

EXAMPLE I

The $\alpha$-alumina powder is first dried at 800° C. for 2 hours and is stored in a desiccator immediately after cooling. Lithium nitrate and sodium carbonate are dried at temperatures of 120° C. and 280° C., respectively and desiccated. Electrical ovens and furnaces can be used for drying purposes.

In order to prepare 100 gms. of $Li_2O:5Al_2O_3$, 25.57 gms. of $LiNO_3$ are mixed with 94.46 gms. of $\alpha$-$Al_2O_3$ in a vibratory mill. The mixture is contained in a loosely covered zirconia crucible; after which it is calcined at 1250° C. for 2 hours. X-ray diffraction revealed that the resulting powder contained essentially one hundred percent $Li_2O:5Al_2O_3$. To make a one hundred (100) gm. batch of $\beta''$-alumina of a composition 8.8 wt.% $Na_2O$ — 0.75 wt.% $Li_2O$ — 90.45 wt.% $\alpha$-$Al_2O_3$, 15.05 gms. of $Na_2CO_3$ and 13.55 gms. of $Li_2O:5Al_2O_3$ are mixed with 77.65 gms. of $\alpha$-$Al_2O_3$ in a vibratory mill. The said mix was calcined at 1250° for two hours in a zirconia crucible followed by a wet-milling step using acetone as the fluid. The powder was then dried to evaporate the acetone.

Rectangular bars were preformed in a steel die followed by isostatic pressing at 55,000 psi. The bars are bisque-fired at ~900° C. for ½ hour to burn off any volatiles that may have been picked up during storage. The bisque-fired specimens were encapsulated in platinum tubes and were sintered at 1585° C. and 1600° C. for times from 3 minutes up to 10 minutes. For sintering the specimens were inserted rapidly into the hot zone of the furnace (from 500° C. to the sintering temperature in about 30 seconds) and after the desired sintering time, were pulled out of the hot zone to a region where the temperature was ~800°–1000° C. (The times at the sintering temperatures are slight overestimates). The density and the resistivty were then measured. The relevant data are given in Table II.

TABLE II

Sintering of $\beta''$-alumina with $Li_2O:5Al_2O_3$
Composition: 8.8 wt. % $Na_2O$-0.75 wt.% $Li_2O$-90.45 wt.% $Al_2O_3$

| Sintering Temperature (° C) | Sintering time (minutes) | Density | | Resistivity ohm-cm at 300° C |
|---|---|---|---|---|
| | | (g/cc) | Theoretical | |
| 1600 | 3 | 3.16 | 97.0 | 7.0 |
| 1585 | 10 | 3.18 | 97.4 | 7.4 |
| 1585 | 3 | 3.19 | 98.0 | 7.5 |

EXAMPLE 2

$LiNO_3$ and $\alpha$-$Al_2O_3$ were mixed in appropriate amounts to produce a composition on a molar basis of "$Li_2O:11Al_2O_3$". The mix of $LiNO_3$ and $\alpha$-$Al_2O_3$ was calcined at 1250° C. for 2 hours in a loosely covered zirconia crucible. The calcined powder mix was milled for 2 hours in a vibratory mill in an environment of acetone. Acetone was later evaporated in an oven to produce a dry powder. X-ray diffraction revealed that "$Li_2O:11Al_2O_3$" contained the compound $Li_2O:5Al_2O_3$ and $\alpha$-$Al_2O_3$. Appropriate amounts of "$Li_2O:11Al_2O_3$", $Na_2CO_3$ and $\alpha Al_2O_3$ were mixed to produce a composition of 8.8 wt.% $Na_2O$ 0.75 wt.% $Li_2O$ — 90.45 wt.% $\alpha$-$Al_2O_3$. The said mixture of the above ingredients was calcined at 1250° C. for 2 hours in a vibratory mill. Rectangular bars were preformed in a steel die followed by isostatic pressing at 55,000 psi. The bars were bisque-fired at 900° C. for ½ hour to burn off any volatiles that may have been picked up during storage. The bisque-fired specimens were encapsulated in platinum tubes and sintered at 1600° C. for 3 to 4 minutes by a procedure identical to the one described in Example 1. The density and resistivity were measured after the sintering. The data are given in Table III.

TABLE III

Sintering of β″-alumina (8.8 wt.% Na$_2$O-0.75 wt.% Li$_2$O 90.45 wt.% α-Al$_2$O$_3$) with "Li$_2$O:11Al$_2$O$_3$"

| Sintering Temp. (°C) | Sintering Time (Minutes) | Density g/cc | %Theoretical | Resistivity (ohm-cm) at 300° C |
|---|---|---|---|---|
| 1600 | 3 | 3.20 | 98.1 | Not Determined |
| 1600 | 3 | 3.18 | 97.5 | 7.3 |
| 1600 | 4 | 3.20 | 98.1 | 7.2 |

TABLE IV

Continuous pass-through sintering in open air of β″-alumina of composition
8.8% Na$_2$O - 0.75% Li$_2$O - 90.45% Al$_2$O$_3$ made by using Li$_2$O:5Al$_2$O$_3$ as a source of lithium.

| Pass-Through Velocity (inch/min) | Density g/cc | % Theoretical | Resistivity at 300° C ohm-cm | Sintering Time (time at 1590° C) in minutes |
|---|---|---|---|---|
| 2.1 | 3.25 | 99.7 | 8.2 | 2.9 |
| 3.0 | 3.24 | 99.4 | 8.7 | 2.0 |
| 4.0 | 3.25 | 99.7 | 8.9 | 1.5 |

EXAMPLE 3

Green ceramic bodies of 8.8 wt.% Na$_2$O 0.75 wt.% Li$_2$O and 90.45 wt.% α-Al$_2$O$_3$ were made using Li$_2$O:5Al$_2$O$_3$ as a source of lithium as described in Example 1. Bar specimens pressed isostatically at 55,000 psi were heated to 400° C. to burn off the binder. The specimens possessed a green density of 63% of the theoretical density of β″-alumina (theoretical density of β″-alumina is taken as 3.26 gms/cc). These specimens were placed on a platinum boat and pulled at various speeds through a tube furnace heated with super Kanthal heating elements to 1590° C. The furnace possessed a hot zone length of about six inches. Density and electrical resistivity at 300° C. were measured on all of the ceramic bodies containing β″-alumina sintered in a continuous pass-through mode without any encapsulation. The relevant data are shown in Table IV.

EXAMPLE 4

Ceramic bodies containing β″-alumina sintered for short times (1–10 minutes) as described in examples 1 to 3 were given an annealing treatment at various temperatures for various lengths of time. The specimens were of nominally 8.8 wt.% Na$_2$O — 0.75 wt.% Li$_2$O — 90.45 wt.% α-Al$_2$O$_3$ composition. A few of the specimens were prepared as described in examples 1 and 2 but using "Li$_2$O:6Al$_2$O$_3$" as the source of lithium which was produced in a similar way as Li$_2$O:5Al$_2$O$_3$ and "Li$_2$O:11Al$_2$O$_3$" and contained a mixture of the compound Li$_2$O:5Al$_2$O$_3$ and α-Al$_2$O$_3$. On some of the sintered ceramic bodies containing β″-alumina, strength was measured in four point bending on bars with a width of ~0.4 inch, a thickness of about 0.1 inch, an outer support span of 1⅜ inches, and an inner span between the load points of ⅜ inch in ambient air under a deflection rate of 0.02 inch/min on an Instron Universal Testing Machine. The densities, resistivities at 300° C. (electrical), strength and microstructures are summarized in Table V on all of the ceramic bodies prepared by the techniques described in examples 1 to 3 and later annealed.

TABLE V

Properties of Sintered and Annealed β″-Al₂O₃ Using Li₂O:5Al₂O₃ as Source of Lithia

| Composition | Source of Lithium | Sintering Temp. °C | Sintering Time (Minutes) | Density g/cc | Annealing Temp. (°C) | Annealing Time (Hours) | Microstructure Grain Size in μm | Resistivity at 300°C (ohm-cm) | Strength (psi) | Sintering Technique Batch vs. Open Air Sinter in Pass-Through Mode |
|---|---|---|---|---|---|---|---|---|---|---|
| 8.8 Wt.% Na₂O | Li₂O:5Al₂O₃ | 1600 | 3 | 3.16 | 1550 | 1 | Fine grained Max. Size ~ 40μm. Typically Duplex Small grains < 10μm | 4.1 | N.D. | Batch - in Platinum |
| 0.75 wt.% Li₂O | " | 1585 | 10 | 3.18 | 1500 | 1 | Same as above but fewer large grains and limited to 30μm | 4.3 | N.D. | Same as above |
| 90.45 wt.% Al₂O₃ | " | 1585 | 3 | *N.D. | 1550 | 1 | N.D. | N.D. | 25,200 | Same as above |
| 8.8 wt.% Na₂O | Li₂O:11Al₂O₃ | 1600 | 3 | 3.20 | 1550 | 2 | Same as above | 4.0 | N.D. | Batch - in Platinum |
| 0.75 wt.% Li₂O | " | 1600 | 3 | 3.18 | 1550 | 2 | Large grains less than 30μm | 4.3 | N.D. | " |
| 90.45 wt.% Al₂O₃ | " | 1600 | 4 | 3.20 | 1570 | 1 | Small grain <10μm | 4.6 | N.D. | " |
|  | " | 1600 | 5 | 3.24 | 1500 | 1 | " | N.D. | 28,900 | " |
| 8.8 wt.% Na₂O | Li₂O:5Al₂O₃ | 1585 | 3 | 3.19 | No anneal | — | Fine grained <5μm | 7.5 | 25,200 | Batch - in Platinum |
| 0.75 wt.% Li₂O | " | 1585 | 3 | 3.19 | 1500 | 1 | N.D. | 4.7 | 20,800 |  |
| 90.45 wt.% Al₂O₃ | Li₂O:5Al₂O₃ | 1590 | 2.9 | 3.25 | 1450 | 11 | N.D. | 3.3-3.9 | N.D. | Open air - Pass-through |
| 8.8 wt.% Na₂O | " | 1590 | 2.0 | 3.24 | 1450 | 11 | N.D. | 3.3-3.9 | N.D. | " |
| 0.75 wt.% Li₂O | " | 1590 | 1.5 | 3.25 | 1450 | 11 | N.D. | 3.3-3.9 | N.D. | " |
| 90.45 wt.% Al₂O₃ | Li₂O:6Al₂O₃ | 1560 | 5 | 3.18 | No anneal | — | Fine grains <5μm | 7.4 | N.D. | Batch - in Platinum |
| 8.8 wt.% Na₂O | Same specimen | 1560 | 5 | 3.18 | 1460 | 4 | N.D. | 6.1 | N.D. | " |
| 0.75 wt.% Li₂O | Same specimen | 1560 | 5 | 3.18 | 1460 | 16 | N.D. | 5.5 | N.D. | " |
| 90.45 wt.% Al₂O₃ | Same specimen | 1560 | 5 | 3.18 | 1460 | 16 | N.D. | 5.2 | N.D. | " |
|  | Li₂O:6Al₂O₃ | 1587 | 4 | 3.22 | 1420 | 2 | 20-40μm Large grains; small <10μm | 3.4 | 26,000 | Batch - in Platinum |
| 8.3 wt.% Na₂O | " | 1587 | 2 | 3.22 | 1300 | 3 | Small grains less than 4μm | 5.6 | 26,000 |  |
| 0.75 wt.% Li₂O | Li₂O:6Al₂O₃ | 1587 | 1.5-2 | 3.20 | 1250 | 43 | N.D. | N.D. | 20,300 | Batch - in Platinum |
| 90.45 wt.% Al₂O₃ |  |  |  |  | 1330 | 48 |  |  |  |  |
| 8.3 wt.% Na₂O 0.75 wt.% Li₂O 90.45 wt.% Al₂O₃ |  |  |  |  | 1350 | 72 |  |  |  |  |

*Not determined

EXAMPLE 5

In order to examine the effect of water vapor on the possible mechanical degradation of $\beta''$-alumina, ceramic bodies containing $\beta''$-alumina were fabricated by the procedures described under examples 1 and 2 followed by an annealing treatment described under example 4. "$Li_2O:6Al_2O_3$" was used as a source of lithium. In one set of experiments, the sintered and annealed specimens of composition 8.6 wt.% $Na_2O$, 0.7 wt.% $Li_2O$ and 90.7 wt.% $Al_2O_3$ were stored in an environment of one hundred (100) percent relative humidity at 25° C. for up to 140 hours. The processing history and changes in resistivity at 300° C. are summarized in Table VI. In this set of experiments specimens were removed from the humidity test chamber every 20 hours to make electrical resistivity measurements. The electrical resistivity data reported in Table VI are after a storage of 140 hours. The strength data are obtained after the humidity tests as well as on some control specimens before the test.

TABLE VI

Resistance of $\beta''$-$Al_2O_3$ Ceramics to Mechanical Degradation in a Humid Environment
Composition: 8.6% $Na_2O$ - 0.7% $Li_2O$ - 90.7% $Al_2O_3$  Source of Lithium: "$Li_2O:6Al_2O_3$"

| Processing History Microstructure | | Resistivity at 300° C (ohm-cm) Before Humidity Test | After 140 hrs. in 100% R.H. | Strength (psi) Before Humidity Test | After 140 hrs. in 100% R.H. |
|---|---|---|---|---|---|
| Sinter 1585° C/10 minutes Anneal: 1350° C/10 hours | | | | | |
| A few 50μm, mostly 10μm | #1 | 4.54 | 4.68 | — | 26,100 |
| | #2 | 4.62 | *N.D. | 27,100 | — |
| | #3 | 4.52 | 4.69 | — | 28,900 |
| | #4 | 4.48 | N.D. | — | 28,100 |
| Sinter 1590° C/5 minutes Anneal: 1500° C/1 hour 1350° C/10 hours | | | | | |
| Less than 10μm | #1 | 5.01 | 5.11 | — | 31,900 |
| | #2 | 5.01 | 5.12 | — | — |
| | #3 | 4.90 | N.D. | 33,700 | — |
| | #4 | 4.81 | N.D. | 33,600 | — |
| Sinter 1585° C/20 minutes Anneal: 1350° C/10 hours | | | | | |
| A few 20μm, mostly 10μm | #1 | 5.05 | N.D. | — | — |
| | #2 | 5.04 | 5.40 | — | 21,600 |
| | #3 | 4.62 | 5.99 | 20,300 | — |
| | #4 | 4.71 | N.D. | — | 27,900 |

*Not determined

EXAMPLE 6

Ceramic bodies containing $\beta''$-alumina of composition 8.8 wt.% $Na_2O$ — 0.75 wt.% $Li_2O$ — 90.45 wt.% $Al_2O_3$ were made by the techniques described in examples 1 and 2. Sintering was accomplished at 1857° C. for 1.5-2 minutes by platinum encapsulation. The said ceramic bodies, in the form of bars, were then annealed by encapsulating in a powder of the said composition for two days at 1250° C., 2 days at 1330° C. and for three days at 1350° C. The said bars were stored in 100% relative humidity chambers at 25° C. The bars were stored at 100% relative humidity for as long as seven days without interruption.

The strength measurements were performed on bars after subject to humidity exposure in an ambient atmosphere at a deflection rate of 0.02 inch/min. wherein the outer span was 1⅜ inches, the inner span was ⅜ inch, the thickness of specimen of ~0.1 inch and the width of the specimens about 0.4 inch on an Instron Universal Testing machine. The relevant data are presented in Table VII.

TABLE VII

Resistance of $\beta''$-$Al_2O_3$ Ceramics to Mechanical Degradation in a Humid (100% RH) Environment

| No. of Days in 100% Relative Humidity | Strength in psi (average of at least) (three specimens) | Resistivity at 300° C in ohm-cm |
|---|---|---|
| 0 | 29,300 | 3.23 |
| 1 day | 33,600 | 4.51 |
| 2 days | 30,100 | 4.14 |
| 3 days | 26,600 | 4.65 |
| 4 days | 31,300 | 6.04 |
| 7 days | 30,100 | 5.41 |

The properties in Table VII are improvements over prior art techniques which claim in U.S. Pat. No. 3,765,915 that only compositions in the range: $Li_2O$: 0.7-1.5 wt.%, $Na_2O$: 8.3-8.9 wt.%, and MgO: 0.5-2.0 wt.% are resistant to mechanical degradation by water vapor.

EXAMPLE 7

Green ceramic bodies of composition 8.8 wt.% $Na_2O$—0.75 wt.% $Li_2O$ and 90.45 wt.% $Al_2O_3$ were made as described in Example 1. Bar specimens pressed isostatically at 55,000 psi were heated to 400° C. to burn off the binder. The specimens were enclosed in a $\beta''$-alumina tube of density 3.15 gms. or more having a slightly higher amount of sodium oxide. An end plug made of $\beta''$-alumina was inserted loosely at the open end to minimize loss of volatile $Na_2O$ during sintering. The $\beta''$-alumina tube with the specimens was passed through the furnace where the temperature of the hot zone of the furnace was at 1590° C. Table VIII gives the relevant data. It should, of course, be noted that results comparable to those in Table VIII can be achieved by encapsulating the specimens in a bed of powder whose composition is similar to the specimens undergoing densification.

TABLE VIII

Sintering of $\beta''$-$Al_2O_3$ Ceramics by Encapsulation in $\beta''$-$Al_2O_3$ Tubes

| Method of Encapsulation | Pass-through Velocity (inch/minutes) | Time at 1590° C (min) | Density (g/cc) | Resistivity at 300° C (ohm-cm) |
|---|---|---|---|---|
| $\beta''$-alumina | 2.1 | 2.9 | 3.25 | 6.8 |
| " | 3.0 | 2.0 | 3.24 | 8.7 |

TABLE VIII-continued

Sintering of $\beta''$-Al$_2$O$_3$ Ceramics by Encapsulation in $\beta''$-Al$_2$O$_3$ Tubes

| Method of Encapsulation | Pass-through Velocity (inch/minutes) | Time at 1590° C (min) | Density (g/cc) | Resistivity at 300° C (ohm-cm) |
|---|---|---|---|---|
| " | 4.0 | 1.5 | 3.23 | 8.7 |

EXAMPLE 8

Using an identical composition and the same procedures as described in Example 7, some experiments were performed by encapsulating specimens in a firing tube of $\beta$-Al$_2$O$_3$ (i.e. Na$_2$O.9Al$_2$O$_3$). Sintering at 1600° C. for 30 minutes produced a ceramic with a 4.4 ohm-cm electrical resistivity at 300° C. $\beta$-Al$_2$O$_3$ tubes are equally effective as $\beta''$-Al$_2$O$_3$ refractory tubes in preventing soda evaporation during sintering.

EXAMPLE 9

Na$_2$CO$_3$, LiNO$_3$, and $\alpha$-Al$_2$O$_3$ were mixed in the appropriate amounts to produce after calcination a mixture with the composition 8.8% Na$_2$O, 0.75% Li$_2$O, and 90.45% Al$_2$O$_3$ (by weight). The said mixture, referred to as an unconverted powder, was prepared by calcining at 1000° C. for 2 hours and consisted of $\alpha$-alumina and the aluminates of sodium and lithium. X-ray analysis indicated that the unconverted powder contained no $\beta$ or $\beta''$-alumina.

A second mixture of the same composition was prepared by calcining appropriate amounts of Na$_2$CO$_3$, LiNO$_3$ and $\alpha$-Al$_2$O$_3$ at 1250° C. for 2 hours to yield a partially converted powder containing $\beta$ and $\beta''$-alumina. This type of powder is typical of the prior art. X-ray analysis of the partially converted powder indicated that it contained approximately 40% $\beta''$-alumina.

A third mixture of the same composition was prepared by a method identical to that described in Example (1).

Rectangular bars were preformed from all three mixtures (unconverted, partially converted, and one containing Li$_2$O:5Al$_2$O$_3$) by isostatic pressing at 55,000 psi. The bars were bisque-fired at 900° C. prior to sintering by platinum encapsulation at 1600° C. for 5 minutes. After sintering, sodium ion resistivities were measured at 300° C. and microstructural examination was performed on the bodies prepared from the three powder mixtures. A summary of the resistivities, microstructural features, and processing conditions for these three powders is given in Table IX.

TABLE IX

Sintering of Unconverted, Partially Converted, and Zeta-Process Powders

| Powder Type | %$\beta''$ | Lithia Distribution | Sintering Temp. ° C | Sintering Time (min.) | Resistivity at 300° C (ohm-cm) | Microstructure |
|---|---|---|---|---|---|---|
| Unconverted (1000° C calcine 2 hrs.) | 0 | Poor | 1600 | 5 | 10.0–15.0 | Matrix of fine grains with several large grains of size ~100–200 micrometers |
| Partially Converted (1250° C calcine 2 hrs.) | ~40 | Fair | 1600 | 5 | 7.0–8.0 | Fine grained matrix with grains as large as ~160 micrometers |
| Zeta-Process (Li$_2$O:5Al$_2$O$_3$) | ~65 | Good | 1600 | 5 | 7.0–7.5 | Fine grained structure - Most grains below 5–10 micrometers with a few up to 25 micrometers in size |

As can be seen from Table IX the lowest resistivity was achieved in the ceramic processed with the zeta lithium aluminate (Li$_2$O:5Al$_2$O$_3$) while the highest resistivity was found in the ceramic processed from the unconverted powder. The resistivity of the ceramic prepared from the partially converted powder was comparable to the zeta-processed ceramic but possessed a microstructure with a much coarser grain structure. However, in the zeta-processed ceramic the largest grains are only 20–25 micrometers after comparable sintering schedules.

The annealing treatment (Refer to Table X) at 1550° C. (1 hour) resulted in a further reduction in the resistivity of the $\beta''$-alumina ceramic prepared from the three powder types. After annealing the zeta-processed ceramic again possessed the lowest resistivity (~4 ohm-cm at 300° C.) while the body processed from unconverted powders possessed the highest resistivity (~5 ohm-cm).

The microstructures after annealing for the three conditions are markedly different. In the ceramic bodies processed from the unconverted and partially converted powders extensive exaggerated grain growth occurred during the high temperature anneal. Grains up to 150 to 300 micrometers were present in the grain size distributions. From previous work on the fracture of dense polycrystalline $\beta''$-alumina the fracture strengths of this material annealed at 1550° C. would be well under 20,000 psi. On the other hand, the fine grained microstructure which was produced in the zeta-processed ceramic after sintering was retained after the high temperature anneal at 1550° C. Thus it is clear that zeta-processed ceramics can be sintered and annealed at relatively high temperatures (over 1500° C.) which is desirable from the point of view of conversion to $\beta''$-alumina. This high temperature processing can be accomplished without the occurrence of any deleterious grain growth which would adversely affect the fracture strength.

TABLE X

Annealing of Unconverted, Partially Converted, and Zeta-Process Powders

| Powder Type | Annealing Temperature (° C) | Annealing Time (hours) | Resistivity at 300° C (ohm-cm) | Microstructure |
|---|---|---|---|---|
| Unconverted | 1550 | 1 | 5.0 | Duplex structure with grains up to 300 micrometers in size |
| Partially Converted | 1550 | 1 | 4.8 | Reasonably uniform with large grains up to 150–200 micrometers in size |
| Zeta-Process | 1550 | 1 | 4.0 | Fine-grained average grain size under 5–10 micrometers. Largest grains up to 25–30 micrometers |

To illustrate the effect of microstructure on fracture strength, $\beta''$-alumina electrolyte tubes of similar composition were fabricated from the unconverted, partially converted, and zeta-processed powders. These tubes (1.5 cm OD) were sintered by platinum encapsulation at temperatures between 1550° and 1585° C. for times between 5 and 10 minutes and annealed for periods of time between 1 and 25 hours at temperatures between 1400° and 1475° C. The particular times and temperatures for each powder type are summarized in Table XI.

This annealing at temperatures significantly lower than 1550° C. (Table X) will permit further conversion to $\beta''$-alumina (i.e. lower resistivities) without the occurrence of any additional grain growth over that which occurred during the sintering step. Thus the fracture strengths of sintered $\beta''$-alumina ceramics prepared from unconverted and partially converted powders and annealed at 1400° C. would be improved over those annealed at 1550° C. (Table X). In Table XI diametral fracture strengths taken from $\beta''$-alumina electrolyte tubing are summarized for ceramic annealed at 1400° C. and prepared from unconverted and partially converted prior art powders. As expected higher strengths (~22,000 psi) were achieved in the lower temperature anneal. However, these strengths are markedly lower than those obtained in the zeta-processed electrolyte tubing (~38,000 psi). The high strengths observed in the zeta-process ceramic are now comparable to those which have been achieved in hot-pressed ceramics developed in our laboratory.

The excellent physical properties and microstructures of the zeta-processed ceamics are believed to be the result of improved distribution of lithium in the $\beta''$-alumina ceramic. This improved distribution leads to enhanced conversion to $\beta''$-alumina during calcination, sintering, and annealing and, at the same time, prevents the occurrence of any deleterious grain growth which adversely affects the mechanical properties.

EXAMPLE 10

A slurry 1.0 micrometer aluminum oxide was made in a solution of lithium nitrate, sodium nitrate, and isooctyl phenoxy polyethoxy ethanol by mixing the following constituents: 310 ml deionized water, 180.4 g alumina, 30.76 g $Na_2CO_3$, 7.36 g $LiNO_3$, about 25 ml $HNO_3$ (added until pH 8 was reached) and 1.8 isooctyl phenoxy polyethoxy ethanol.

This slurry was spray dried in a cocurrent spray drier with two-fluid atomization. The spray dried powder was calcined at 1260° C. for 75 minutes.

Forty grams of the calcined powder in 25 ml of acetone were milled for 2 hours with 200 g of 0.5 inch diameter and height cylindrical alumina media. The resulting powder was analyzed as containing 9.2% $Na_2O$. The milled powder was isostatically pressed at 55,000 psi to form bars and sintered for 10 minutes by platinum encapsulation at 1635° C. The resulting bars had a resistivity of 4.9 ohm-cm (300° C.) and a density 97% of theoretical (3.16 g/cc). When sintered for 6 minutes at 1610° C. the bars had resistivities at 300° C. between 4.1 and 5.7 ohm-cm and densities between 3.14 and 3.16 g/cc (i.e. between 96.3% and 96.9% of theoretical).

While there has been shown and described what are at present considered the preferred embodiments of the invention, it will be obvious of those skilled in the art that various changes and modifications may be made therein without departing from the scope of the invention as defined by the appended claims. For example, numerous raw material sources of $Li_2O$, $Na_2O$, and $Al_2O_3$ can be employed. The invention will be applicable to any method of green forming the ceramic body in the presintered condition such as pressing, isostatic pressing, extrusion, injection molding, tape casting, and electrophoretic deposition to name but a few. Finally, numerous sintering techniques are possible within the scope of the invention. They include batch or continuous firing and sintering in an open-air atmosphere or by

TABLE XI

Strengths of $\beta''$ - Alumina Ceramics Prepared from Unconverted, Partially Converted, and "Zeta-Process Powders

| Powder Type | Composition | Sintering Temperature ° C | Sintering Time (min) | Annealing Temperature ° C | Annealing Time (hours) | Diametral Fracture Strength (kpsi) | Range (kpsi) |
|---|---|---|---|---|---|---|---|
| Unconverted | 8.8% $Na_2O$-0.75% $Li_2O$ | 1550 | 5 | 1400 | 25 | 22.8 | 17–25 |
| Unconverted | 8.8% $Na_2O$-0.75% $Li_2O$ | 1550 | 5 | NO ANNEAL | | 22.5 | 17–25 |
| Partially Converted | 8.8% $Na_2O$-0.75% $Li_2O$ | 1585 | 7 | 1400 | 8 | 24.0 | 17–30 |
| Zeta Processed | 8.85% $Na_2O$-0.75% $Li_2O$ | 1585 | 5–10 | 1475 | 1 | 38.0 | 27–53 | encapsulation in (1) a powder of similar composition, (2) in a noble metal container such as platinum, (3) in a $\beta''$-Al$_2$O$_3$ tube of similar composition and (4) in a $\beta$-Al$_2$O$_3$ tube.

We claim:

1. A method for preparing a dense, strong polycrystalline $\beta''$-alumina-containing ceramic body exhibiting (i) an electrical resistivity for sodium ion conduction at 300° C. of less than or equal to about 9 ohm-cm, and (ii) a fine, uniform microstructure and resultant fracture strength comparable to that achieved by hot pressing techniques, comprising:

(A) preparing a powder mixture comprising aluminum oxide, sodium oxide and lithium oxide in stoichiometric proportions required to produce $\beta''$-alumina upon being heated to crystal forming temperatures, said lithium oxide being present in amounts ranging from about 0.1 to about 5 weight percent of the total of said mixture and being provided by a lithium aluminate compound having the formula Li$_2$O:$n$Al$_2$O$_3$ wherein $n$ equals at least 5;

(B) green forming said preparing mixture to the desired shape; and (C) sintering the green formed body at a temperature above about 1500° C. until desirable conversion to $\beta''$-alumina and near theoretical density for same are achieved.

2. A method in accordance with claim 1 wherein said powder mixture is prepared by (A) preparing a mixture of
 (1) aluminum oxide;
 (2) sodium oxide or a sodium salt capable of decomposing to form sodium oxide; and
 (3) said lithium aluminate compound in such proportion that the reaction mixture will provide the necessary stoichiometric amounts of aluminum oxide, sodium oxide and lithium oxide to form $\beta''$-alumina; and (B) calcining said mixture at a temperature above about 1100° C.

3. A method in accordance with claim 2 wherein said green formed body is sintered at a temperature of between about 1500° C. and about 1600° C. for less than about 10 minutes.

4. A method in accordance with claim 3, wherein said $\beta''$-alumina containing ceramic body is subjected to a post-sinter anneal at a temperature of less than about 1600° C. to further reduce its electrical resistivity to sodium ion conduction.

5. A method in accordance with claim 2, wherein (i) said lithium aluminate compound is represented by the formula Li$_2$O:5Al$_2$O$_3$ and (ii) said green formed body is sintered at a temperature between about 1560° and about 1600° C. for less than about 10 minutes.

6. A method in accordance with claim 5 wherein said $\beta''$-alumina containing ceramic body is subjected to a post-sinter anneal at a temperature of less than about 1600° C. for less than about 1 hour to further reduce its electrical resistivity to sodium ion conduction.

7. A method in accordance with claim 1 wherein said powder mixture is prepared by (A) preparing a mixture of
 (1) aluminum oxide; and
 (2) sodium oxide or a sodium salt capable of decomposing to form sodium oxide, said sodium salt being included in said mixture in an amount sufficient to provide the necessary stoichiometric amount of sodium oxide;

(B) calcining said mixture at a temperature above 1100° C.; and (C) mixing said lithium aluminate compound with the calcined mixture in such proportions that the reaction mixture contains stoichiometric amounts of aluminum oxide, sodium oxide and lithium oxide to form $\beta''$-alumina.

8. A method in accordance with claim 7 wherein said green formed body is sintered at a temperature of between about 1500° C. and about 1600° C. for less then about 10 minutes.

9. A method in accordance with claim 7 wherein said $\beta''$-alumina containing ceramic body is subjected to a post-sinter anneal at a temperature of less than about 1600° C. to further reduce its electrical resistivity to sodium ion conduction.

10. A method in accordance with claim 7, wherein (i) said lithium aluminate compound is represented by the formula Li$_2$O:5Al$_2$O$_3$ and (ii) said green formed body is sintered at a temperature between about 1560° and about 1600° C. for less than about 10 minutes.

11. A method in accordance with claim 1 wherein said green formed body is sintered at a temperature between about 1500° and 1600° C.

12. A method in accordance with claim 1 wherein said green formed body is sintered at a temperature between about 1560° and about 1600° C. for less than about 10 minutes.

13. A method in accordance with claim 12 wherein said body is sintered for between about 1 and about 3 minutes.

14. A method in accordance with claim 1 wherein $n$ of said lithium aluminate compound Li$_2$O—$n$Al$_2$O$_3$ equals from 5 to 11.

15. A method in accordance with claim 1 wherein said lithium aluminate compound is represented by the formula Li$_2$O:5Al$_2$O$_3$.

16. A method in accordance with claim 15 wherein said $\beta''$-alumina containing ceramic body is subjected to a post-sinter anneal at a temperature of less than about 1600° C. for less than about 1 hour to further reduce its electrical resistivity to sodium ion conduction.

17. A method in accordance with claim 1 wherein said $\beta''$-alumina containing ceramic body is subjected to a post-sinter anneal at a temperature of less than about 1600° C. to further reduce its electrical resistivity to sodium ion conduction.

18. A method in accordance with claim 1 wherein (i) said lithium aluminate compound is represented by the formula Li$_2$O:5Al$_2$O$_3$ and (ii) said green formed body is sintered at a temperature between about 1560° and about 1600° C. for less than about 10 minutes.

19. A method in accordance with claim 18 wherein said powder mixture is prepared by calcining a mixture of said alumina, said sodium salt and said lithium aluminate compound at a temperature above about 1100° C.

20. A method in accordance with claim 18 wherein said powder mixture is prepared by calcining a mixture of said alumina, said sodium salt at a temperature above about 1100° C. and then mixing said lithium aluminate compound therewith.

21. A method in accordance with claim 18 wherein said $\beta''$-alumina containing ceramic body is subjected to a post-sinter anneal at a temperature of less than about 1600° C. for less than about 1 hour to further reduce its electrical resistivity to sodium ion conduction.

22. A method for preparing a dense, strong polycrystalline $\beta''$-alumina-containing ceramic body exhibiting (i) an electrical resistivity for sodium ion conduction at 300° C. of less than or equal to about 9 ohm-cm, and (ii) a fine, uniform microstructure and resultant high fracture strength comprising:

(A) preparing a partially deflocculated slurry of alpha or beta alumina in an aqueous solution containing a soluble sodium salt and lithium salts or mixtures thereof, the anions of which are subject to decomposition and/or vaporization at temperatures below about 1300° C. to form sodium oxide and lithium oxide which in combination with said aluminum oxide will provide a stoichiometric composition suitable for formation of $\beta\rightarrow$-alumina upon sintering:

(B) spray drying said slurry to form a powder.

(C) calcining said powder at a temperature below about 1300° C. to obtain said stoichiometric composition;

(D) green forming said powder to form a green body of the desired shape; and (E) sintering said body at a temperature above about 1500° C. for at least about 1 minute.

23. A method in accordance with claim 22 wherein said slurry includes a lithium salt selected from the group consisting of lithium nitrate, lithium oxalate and lithium chloride.

24. A method in accordance with claim 22 wherein said slurry includes magnesium-aluminum spinel.

25. A method in accordance with claim 22 wherein said green body is sintered at a temperature of about 1560° to about 1600° C. for less than about 10 minutes.

26. A method in accordance with claim 22 wherein said slurry is stabilized by the addition of isooctyl phenoxy polyethoxy ethanol.

* * * * *

UNITED STATES PATENT AND TRADEMARK OFFICE
CERTIFICATE OF CORRECTION

PATENT NO. : 4,113,928
DATED : September 12, 1978
INVENTOR(S) : Anil V. Virkar; Mark L. Miller; Ivan B. Cutler; Ronald S. Gordon It is certified that error appears in the above-identified patent and that said Letters Patent are hereby corrected as shown below:

In Claim 8, line 10. Delete "then" and replace therefor --than--.

In Claim 22, line 17. Delete "$\beta \rightarrow$" and replace therefor -- $\beta''$ --.

Signed and Sealed this

Twentieth Day of February 1979

[SEAL]

Attest:

RUTH C. MASON
Attesting Officer

DONALD W. BANNER
Commissioner of Patents and Trademarks